(12) United States Patent
Ulcej

(10) Patent No.: US 9,085,104 B2
(45) Date of Patent: Jul. 21, 2015

(54) SCULPTED EXTRUSION DIE

(75) Inventor: John A. Ulcej, Colfax, WI (US)

(73) Assignee: Nordson Corporation, Westlake, OH (US)

( * ) Notice: Subject to any disclaimer, the term of this patent is extended or adjusted under 35 U.S.C. 154(b) by 972 days.

(21) Appl. No.: 13/187,008

(22) Filed: Jul. 20, 2011

(65) Prior Publication Data

US 2013/0020737 A1  Jan. 24, 2013

(51) Int. Cl.
*B29C 47/32* (2006.01)
*B29C 47/16* (2006.01)
*B29C 47/00* (2006.01)
*B29C 47/92* (2006.01)
*B29C 47/08* (2006.01)

(52) U.S. Cl.
CPC .............. *B29C 47/32* (2013.01); *B29C 47/0021* (2013.01); *B29C 47/165* (2013.01); *B29C 47/92* (2013.01); *B29C 47/0828* (2013.01); *B29C 2947/92152* (2013.01); *B29C 2947/92647* (2013.01); *B29C 2947/92904* (2013.01)

(58) Field of Classification Search
None
See application file for complete search history.

(56) References Cited

U.S. PATENT DOCUMENTS

| | | |
|---|---|---|
| 1,844,972 A | 2/1932 | Parkhurst |
| 2,318,469 A | 5/1943 | Derby et al. |
| 2,330,282 A | 9/1943 | Hazeltine et al. |
| 2,892,212 A | 6/1959 | Rhodes |
| 3,142,091 A | 7/1964 | Curtiss |
| 3,274,645 A | 9/1966 | Chase |
| 3,347,962 A * | 10/1967 | Dieck et al. ................... 264/556 |
| 3,525,785 A | 8/1970 | Fairbanks |
| 3,609,810 A * | 10/1971 | Coghill ......................... 425/113 |
| 3,790,326 A | 2/1974 | Larsen |
| 3,871,810 A | 3/1975 | Geyer |
| 3,895,898 A | 7/1975 | Theysohn |
| 3,956,056 A * | 5/1976 | Boguslawski et al. ........ 156/500 |
| 4,111,631 A | 9/1978 | Gabbrielli |
| 4,174,200 A | 11/1979 | Hoj |

(Continued)

FOREIGN PATENT DOCUMENTS

| | | |
|---|---|---|
| EP | 0484721 A2 | 5/1992 |
| GB | 1510005 A | 5/1978 |
| GB | 2249518 A | 5/1992 |

OTHER PUBLICATIONS

PCT/US2012/047388, International Search Report dated Oct. 30, 2012, 5 pages.

(Continued)

*Primary Examiner* — Jeffrey Wollschlager
(74) *Attorney, Agent, or Firm* — Fredrikson & Byron, P.A.

(57) ABSTRACT

An extrusion device includes a sculpted extrusion die comprising a pair of mating die lips having sculpted surfaces and defining a die exit for an extrudate. The contour of the sculpted surfaces is substantially similar to the contour of a juxtaposed surface configured for receiving the extrudate from the die exit of the sculpted extrusion die. The sculpted extrusion die preferably comprises a die lip adjustment mechanism for adjusting a thickness of the extrudate exiting the die exit and the thickness of the extrudate received on the juxtaposed surface. The air gap between the die exit of the sculpted extrusion die and the juxtaposed surface preferably is substantially eliminated by adjusting the distance between the sculpted surfaces and the juxtaposed surface. A method of adjusting a thickness of a substantially continuous sheet of extrudate formed using an embodiment of the sculpted extrusion die of the invention is provided.

12 Claims, 4 Drawing Sheets

(56) References Cited

U.S. PATENT DOCUMENTS

| | | | |
|---|---|---|---|
| 4,281,980 A * | 8/1981 | Hoagland et al. | 425/461 |
| 4,781,562 A | 11/1988 | Sano et al. | |
| 4,863,361 A * | 9/1989 | Boos | 425/141 |
| 4,963,309 A | 10/1990 | Gohlisch et al. | |
| 5,067,432 A * | 11/1991 | Lippert | 118/413 |
| 5,122,049 A | 6/1992 | Baumgarten | |
| 5,256,052 A | 10/1993 | Cloeren | |
| 5,259,747 A | 11/1993 | Cloeren | |
| 5,423,668 A * | 6/1995 | Cloeren | 425/141 |
| 5,441,687 A | 8/1995 | Murasaki et al. | |
| 5,453,238 A | 9/1995 | Bardy | |
| 5,770,240 A | 6/1998 | Krupa | |
| 5,779,962 A | 7/1998 | Andraschko et al. | |
| 6,109,592 A | 8/2000 | Lippert et al. | |
| 6,206,680 B1 | 3/2001 | Ulcej | |
| 6,352,424 B1 | 3/2002 | Ulcej | |
| 6,367,776 B1 | 4/2002 | Lippert et al. | |
| 6,660,121 B2 * | 12/2003 | Harvey et al. | 156/244.27 |
| 6,663,375 B1 | 12/2003 | Ulcej | |
| 6,682,333 B2 | 1/2004 | Ulcej et al. | |
| 6,705,146 B2 | 3/2004 | Jansson | |
| 6,715,330 B2 | 4/2004 | Jansson | |
| 6,821,106 B1 | 11/2004 | Looman, Jr. et al. | |
| 6,994,817 B2 | 2/2006 | Calvar et al. | |
| 7,056,112 B2 | 6/2006 | Ulcej | |
| 7,074,030 B2 | 7/2006 | Ulcej et al. | |
| 7,410,604 B2 * | 8/2008 | Erickson et al. | 264/216 |
| 2007/0045904 A1 | 3/2007 | Ulcej et al. | |
| 2007/0273068 A1 | 11/2007 | Ulcej et al. | |

OTHER PUBLICATIONS

Notification of Transmittal of International Preliminary Report on Patentability, dated Jul. 29, 2013, 6 pgs., for corresponding PCT Application No. PCT/US12/47388.

* cited by examiner

SCULPTED EXTRUSION DIE

TECHNICAL FIELD

The present invention relates to an extrusion device and more particularly to an extrusion die for extruding thermoplastic material.

BACKGROUND

An extrusion die is used to extrude molten thermoplastic material into a relatively thin film or sheet. Conventional extrusion dies have a die cavity with the general shape of a coat hanger. These extrusion dies have been generally referred to as coat hanger dies. Typical coat hanger dies include an inlet, an inlet manifold, a generally triangular shaped preland channel, a final land channel, and a die exit or gap. In some embodiments, a back edge of the preland channel includes linear edges that form a taper converging towards a die entrance. In alternate embodiments, the taper converges away from (or diverges towards) the die entrance. The preland channel provides a resistance to flow that varies over the width of the die to uniformly spread the thermoplastic material across the entire die.

The rheological characteristics of the molten thermoplastic materials and the pressure these thermoplastic materials exert on the die bodies sometimes result in clamshelling, or nonuniform deflection. Clamshelling results in uneven flow of the thermoplastic material through the die exit. These or other nonuniform patterns are undesirable for the production of flat sheet materials. The nonuniformities can be corrected by adjusting the height of the die exit. Most extrusion dies are equipped with some form of die lip adjustment mechanism to adjust the height of the die exit. If a particular die is used to form a large quantity of a single layer of material, and the extrusion process is not subject to any interruptions, then the adjustment of the height of the die exit is an acceptable method of removing or at least addressing these nonuniformities. However, since the performance of an extrusion die is influenced by a number of factors including flow rate, temperature, the nature of the thermoplastic materials, and the like, the use of the lip adjustment mechanism to remove or minimize these nonuniformities may not always be practical where a die is to be used for short runs to produce different products. For each production change, the die lips may be adjusted to the new conditions. This results in a loss of production time and a waste of material as off-specification product is produced during start up.

When extruding thermoplastics using a conventional die, the molten polymer exits the die and travels through an air gap prior to contacting the surface of a roller receiving the extrudate. As is well known in the art, as the extrudate flows across the air gap and is pulled away from the die by the rotating roller, stress can be induced in the web. Additionally, variations in the web's gauge (or thickness) can occur, particularly at the edges which become thicker as the web narrows. There is little that can be done to control the flow of the extrudate in the air gap. Furthermore, die lines are formed if the extrudate drags along one of the die lips. These and other nonuniformities in the extrudate can be exacerbated by the air gap between the die exit and the surface of the roller receiving the extrudate. Such defects are unacceptable in most extruded products, but are particularly troublesome in products that require good optical properties. Accordingly, die builders are asked to minimize the air gap.

In the past, die builders have typically attempted to decrease the air gap by angling the die such that the die exit is positioned as close to the roller as possible. However, this approach weakens the die and mechanical limitations become challenging. Other proposals to address these problems have included the design of different manifold configurations. In one such design, the back line of the preland portion is structured to be a uniform distance from the die exit. While this particular design may minimize the above problems, there are concerns relative to maintaining the flow through the die without creating areas of substantially higher residence time, which over time could lead to degradation of the thermoplastic material.

Accordingly, there exists a need for an extrusion device with essentially no air gap for extruding low stress sheet and film with acceptable optical properties, minimal die lines, and minimal edge bead formation without compromising the mechanical integrity of the die.

SUMMARY

In accordance with an embodiment of the invention there is provided a sculpted extrusion die juxtaposed with a roller of an extrusion device. The sculpted extrusion die comprises a pair of mating die lips each having sculpted surfaces and defining a die exit for an extrudate. The contour of the sculpted surfaces, in an embodiment of the invention, are substantially similar to the contour of a juxtaposed surface configured for receiving the extrudate from the die exit of the sculpted extrusion die. Accordingly, the radius of curvature of the sculpted surfaces is substantially equal to the radius of the roller. The sculpted extrusion die further comprises a die lip adjustment mechanism for adjusting a thickness of the extrudate exiting the die exit and the thickness of the extrudate received on the roller. As such, the air gap between the roller and the extrusion die is minimized by adjusting the distance between the sculpted surfaces and the juxtaposed surface. In an embodiment of the invention, the die exit is devoid of any sharp corners or edges and/or catch surfaces that would interfere with the smoothness of the exiting extrudate. In some embodiments, the sculpted extrusion die is juxtaposed with a casting roller. In other embodiments, the sculpted extrusion die is juxtaposed with one of a pair of cooperating rollers defining a nip of a calender.

A method of adjusting a thickness of a substantially continuous sheet of extrudate formed using an embodiment of the sculpted extrusion die of the invention is provided.

In accordance with another embodiment of the invention, there is provided an extrusion device comprising an extrusion die juxtaposed with a roller, wherein the extrusion die includes a manifold in fluid communication with a die exit defined by a pair of die lips. In an embodiment of the invention, the die lips include sculpted surfaces that are contoured into shapes that substantially match a perimetrical shape of the roller. The sculpted surfaces of the extrusion die are configured for placement alongside the roller such that during operation there is substantially no air gap between the sculpted surfaces of the extrusion die and the roller.

DETAILED DESCRIPTION

While selected embodiments of the instant invention are disclosed, alternate embodiments will be apparent to those skilled in the art given the present disclosure as a guide. The following detailed description describes only illustrative embodiments of the invention with reference to the accompanying drawings wherein like elements are designated by like numerals. It should be clearly understood that there is no intent, implied or otherwise, to limit the invention in any form or manner to that described herein. As such, all alternatives are considered as falling within the spirit, scope and intent of the instant invention.

Figure 1:
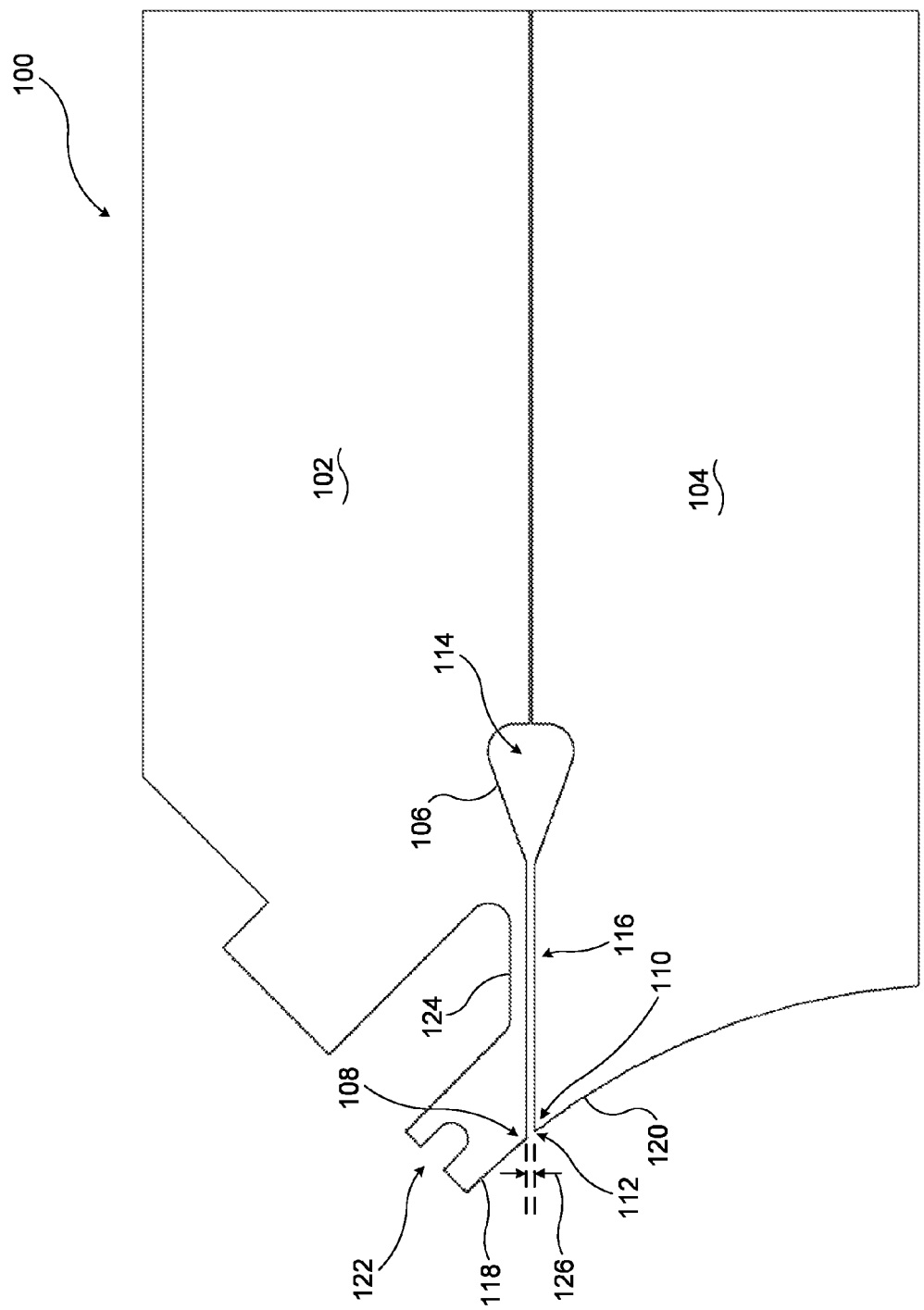
FIG. 1 is a schematic of a sculpted extrusion die in accordance with an embodiment of the invention.
Figure 2:
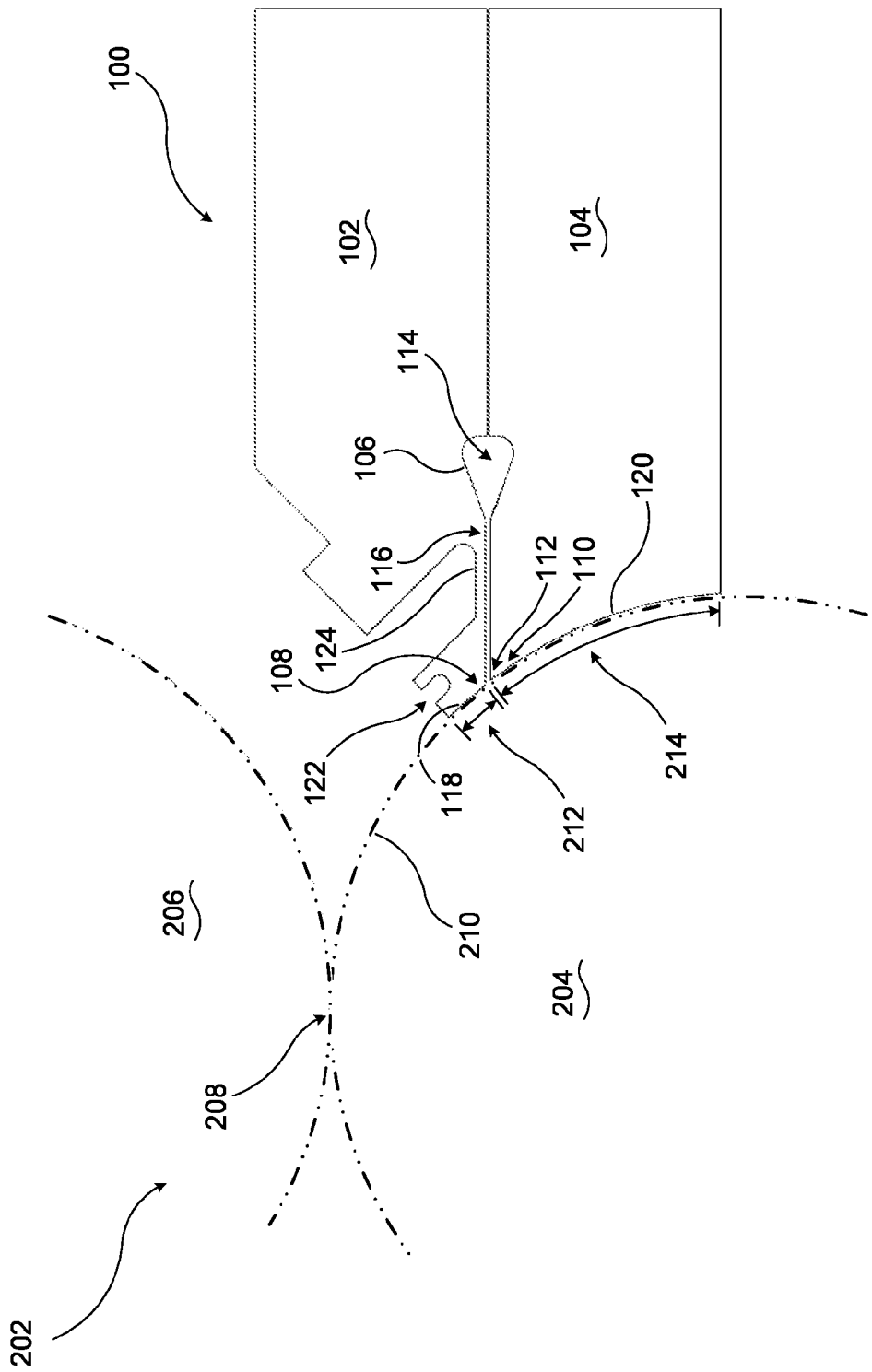
FIG. 2 illustrates the sculpted extrusion die of FIG. 1 juxtaposed with a circumferential surface of a roller of a calender.
Figure 3:
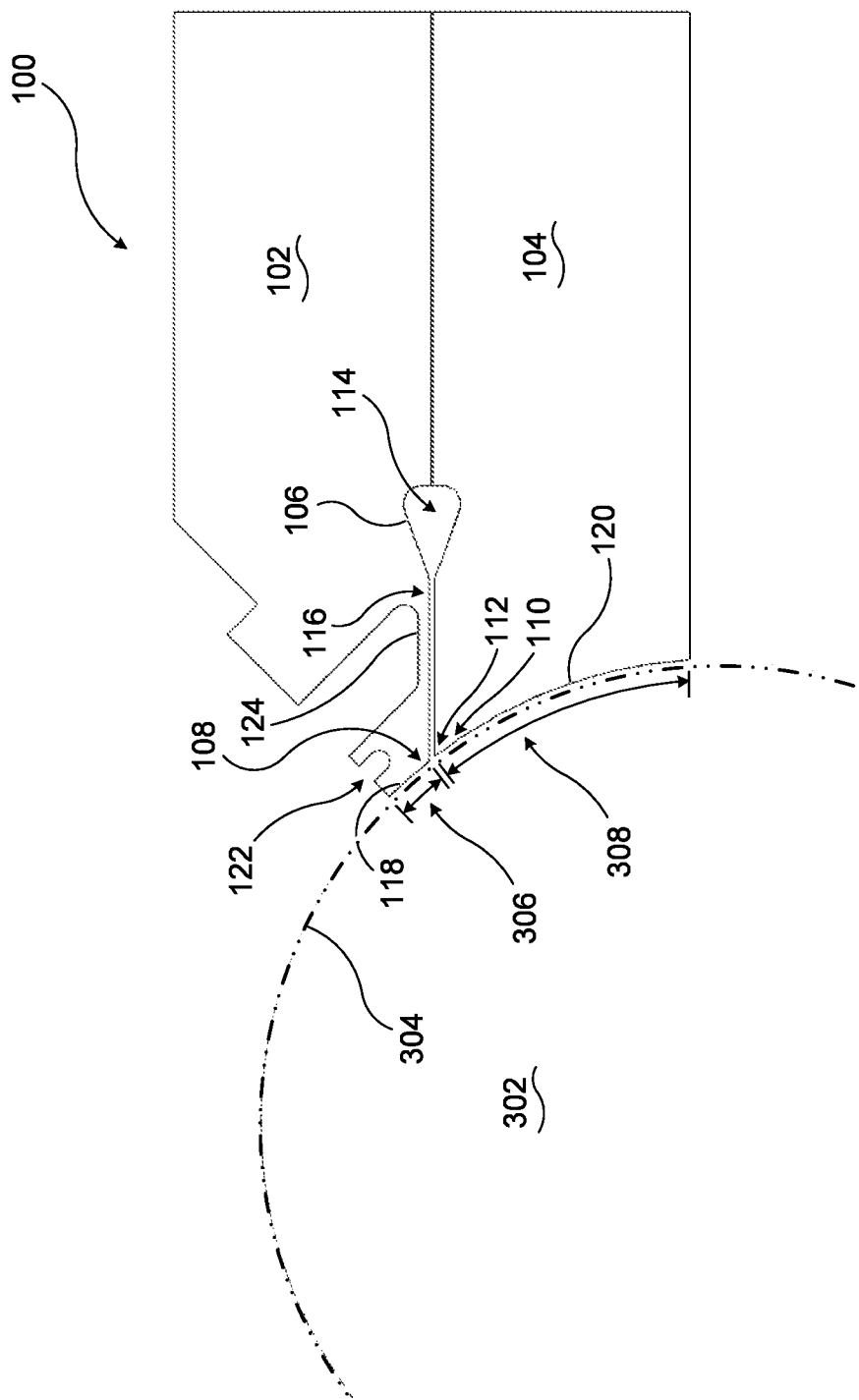
FIG. 3 illustrates the sculpted extrusion die of FIG. 1 juxtaposed with a circumferential surface of a casting roller.

Sculpted extrusion die 100, in accordance with an embodiment of the invention, is illustrated in FIGS. 1-3 wherein like elements are indicated by like numerals. The illustrated extrusion die 100 comprises upper and lower die body portions 102 and 104, respectively, which together form a pair of mating die body portions defining manifold 106. Upper and lower die body portions 102 and 104, respectively, include (e.g., define) upper and lower die lips 108 and 110, which together form a pair of mating die lips defining die exit 112. As an alternative, a single die body could define both die body portions 102 and 104 of the die, including respective upper and lower die lips 108 and 110.

Figure 4:
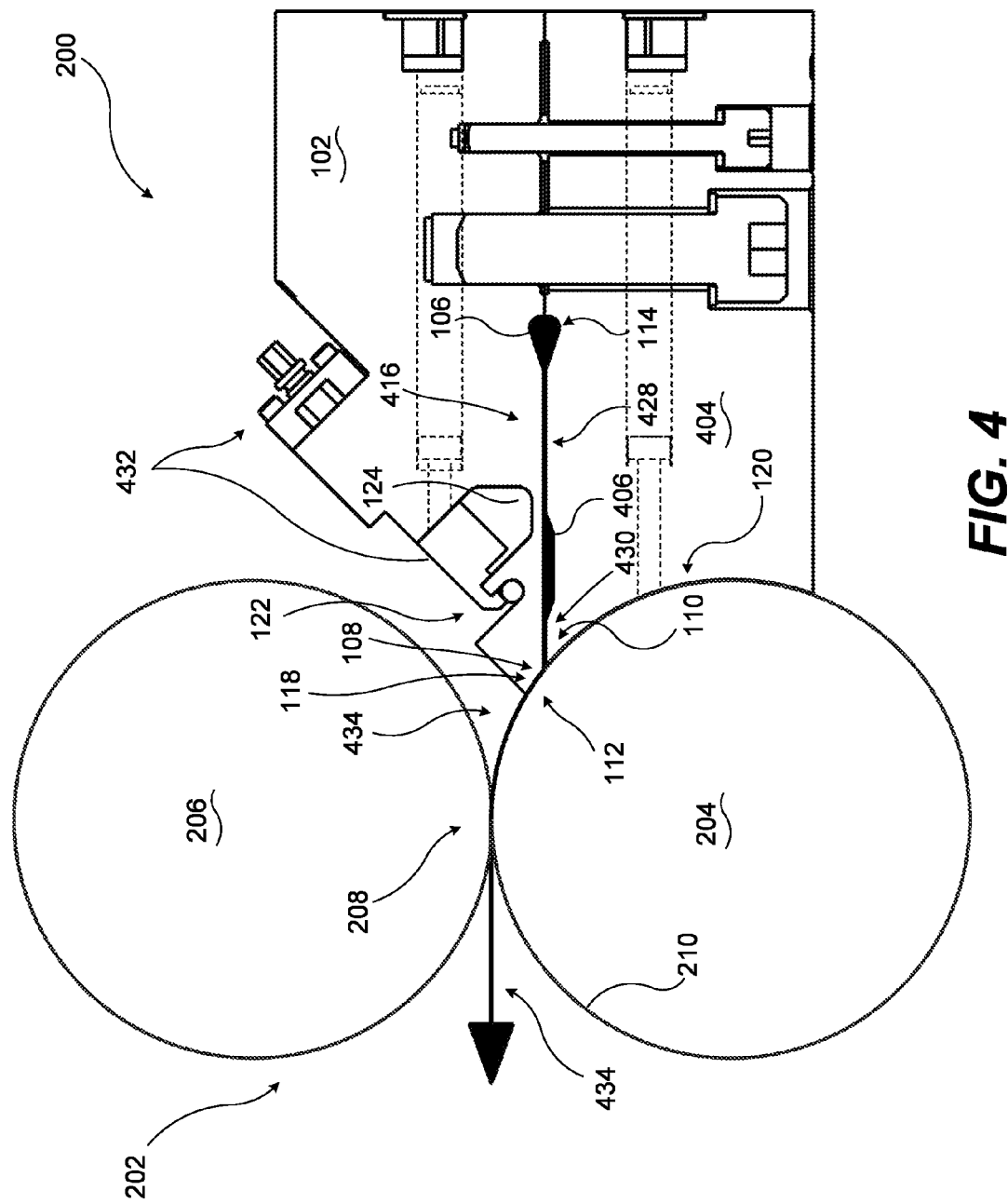
FIG. 4 shows extrudate flow in an alternate embodiment of a sculpted extrusion die juxtaposed with a circumferential surface of a roller of a calender.

Manifold 106 is illustrated as being a standard coat hanger type die manifold as is well known in the art. Alternatively, other manifold designs that are also well known in the art could be used including, but not limited to, "T" manifolds, fishtail manifolds and variations of coat hanger type die manifold 106. In some applications, the die manifold includes one or more restrictor bars. The illustrated manifold 106 includes cavity 114. A flow channel 116 extends from manifold 106. As illustrated, flow channel 116 provides fluid communication between manifold 106 and die exit 112. In the illustrated embodiment, flow channel 116 extends along a straight line. This, however, is not strictly required. The extrudate supplied to manifold 106 flows through flow channel 116 and exits extrusion die 100 through die exit 112. In some embodiments, as is well known in the art, flow channel 116 includes a secondary manifold, as described herein below with reference to FIG. 4, between manifold 106 and die exit 112. In such cases, the section of flow channel 116 between manifold 106 and the secondary manifold may be referred to as the preland section, and the section of flow channel 116 between the secondary manifold and die exit 112 may be referred to as the land section. As is also well known in the art, the exact structure of manifold 106, cavity 114, the land and preland sections, as illustrated in FIG. 4, and any secondary manifold (not shown in FIGS. 1-3) can be varied and may conform to any of a number of different conventional designs for a coat hanger type extrusion die.

In accordance with an embodiment of the invention, sculpted extrusion die 100 differs from prior art extrusion dies in that the upper and lower die lips 108 and 110, respectively, comprise sculpted surfaces 118 and 120. As illustrated in FIGS. 1-3, die body portion 102, upper die lip 108 and sculpted surface 118 are all defined by a first single integral body; and die body portion 104, lower die lip 110 and sculpted surface 120 are all defined by a second single integral body. In an alternate embodiment wherein a single die body defines both die body portions 102 and 104, both upper and lower die lips 108 and 110 and their respective sculpted surfaces 118 and 120 are defined by the same single (or "integral") die body. As described below with reference to FIGS. 2 and 3, the contours of sculpted surfaces 118 and 120 are substantially similar to the contour of a juxtaposed surface configured for receiving the extrudate exiting die exit 112. In an embodiment of the invention, the juxtaposed surface is that of a roller. In another embodiment of the invention, the juxtaposed surface is a circumferential surface. In yet another embodiment, the juxtaposed surface is a perimetrical surface. In an alternate embodiment of the invention, the juxtaposed surface is that of a polygon. In another embodiment of the invention, the juxtaposed surface is that of a cylinder. All alternative embodiments of a juxtaposed surface configured for receiving the extrudate exiting die exit 112 are considered as falling within the spirit, scope and intent of the instant invention. In the interest of brevity, simplicity and understanding, all such alternate embodiments of juxtaposed surfaces configured for receiving the extrudate exiting die exit 112 are herein after referred to as circumferential (or perimetrical) surfaces and/or extents in the description and the appended claims.

FIG. 2 illustrates sculpted extrusion die 100 as used with calender 202 in accordance with an embodiment of the invention. Calender 202, as is well known in the art, comprises a pair of cooperating rollers 204 and 206 defining nip 208 therebetween. As shown, the contours of sculpted surfaces 118 and 120 are substantially similar to (e.g., they may match) the contour of circumferential (or perimetrical) surface 210 of roller 204 onto which the extrudate exiting die exit 112 is received. As such, first circumferential (or perimetrical) extent 212 of roller 204 is nested against sculpted surface 118 of upper die lip (or flexible lip) 108, and second circumferential (or perimetrical) extent 214 of roller 204 is nested against sculpted surface 120 of lower die lip 110. In an embodiment of the invention, second circumferential (or perimetrical) extent 214 is greater than first circumferential (or perimetrical) extent 212. This, however, is not required. In some embodiments, the arithmetic ratio of second circumferential (or perimetrical) extent 214 to first circumferential (or perimetrical) extent 212 is greater than or equal to two, greater than or equal to three, or greater than or equal to four. This, however, this is not required in all embodiments.

FIG. 3 illustrates sculpted extrusion die 100 as used with a single roller 302 (e.g., a casting roller) in accordance with an embodiment of the invention. As shown, the contours of sculpted surfaces 118 and 120 are substantially similar to the contour of circumferential (or perimetrical) surface 304 of roller 302 onto which the extrudate exiting die exit 112 is received. As such, first circumferential (or perimetrical) extent 306 of roller 302 is nested against sculpted surface 118 of upper die lip (or flexible lip) 108, and second circumferential (or perimetrical) extent 308 of roller 302 is nested against sculpted surface 120 of lower die lip 110. In an embodiment of the invention, second circumferential (or perimetrical) extent 308 is greater than first circumferential (or perimetrical) extent 306. In some embodiments, the arithmetic ratio of second circumferential (or perimetrical) extent 308 to first circumferential (or perimetrical) extent 306 is greater than or equal to two, greater than or equal to three, or greater than or equal to four. Again, this is not required.

As illustrated in FIGS. 2 and 3, sculpted surfaces 118 and 120 preferably have a radius of curvature substantially equal to (or equal to) a radius of rollers 204 and 302. While this will commonly be preferred, it is by no means strictly required.

As shown in FIGS. 1-3, the illustrated upper die lip 108 includes die lip adjustment channel 122 configured for accepting any of a number of conventional die lip adjustment mechanisms as are well known in the art. One such embodiment is described herein below with reference to FIG. 4. The illustrated upper die lip 108 further comprises a relatively narrow neck 124 serving as a thin flex hinge. The flex hinge provides a certain degree of flexibility, thus making the upper die lip 108 a flexible lip, such that narrow neck 124 flexes when upper die lip 108 is moved by the die lip adjustment mechanism. The configuration of die lip adjustment channel 122, however, can be varied to accommodate many different die lip adjustment mechanisms. Thus, the related details shown in the attached drawings (e.g., the flex hinge, die lip adjustment channel 122, etc.) are not limiting to the invention. As illustrated, lower die lip 110 is a fixed lip, rather than being a flexible lip. In an alternate embodiment (not shown), lower die lip 110 is a flexible lip and upper die lip 108 is a fixed lip. In another embodiment (also not shown), both upper and lower die lips 108 and 110 are flexible lips.

In an embodiment of the invention, the die lip adjustment mechanism is used for moving the flexible lip (i.e., the upper die lip 108, which is rendered flexible by the flex hinge) so as to effectuate the thickness of the extrudate exiting die exit 112, e.g., by adjusting the distance between sculpted surface 118 and the juxtaposed circumferential (or perimetrical) roller surface 210 or 304. In fact, the die lip adjustment mechanism may be used for adjusting both the thickness of the extrudate exiting die exit 112 and the thickness of the extrudate on circumferential (or perimetrical) surface 210 or 304. Further, the thickness of the extrudate on circumferential (or perimetrical) surface 210 or 304, respectively, can also be adjusted by moving roller 204 or 302 towards or away from sculpted surface 118.

The air gap between sculpted extrusion die 100 and roller 204 or 302 preferably is substantially eliminated (or eliminated) by adjusting the distance between sculpted surfaces 118 and 120 and circumferential (or perimetrical) roller surface 210 or 304. In an embodiment of the invention, roller 204 or 302 is operatively juxtaposed with sculpted surfaces 118 and 120 such that there is substantially no air gap between sculpted die 100 and roller 204 or 302. In such cases, the extrudate emanating through die exit 112 of sculpted extrusion die 100 preferably does not travel across an air gap prior to contacting roller 204 or 302.

In an embodiment of the invention, die exit 112 is devoid of any sharp corners or edges and/or catch surfaces that would interfere with the smoothness of the extrudate or disrupt extrudate flow or both. Preferably, this is the case all along the path of extrudate travel (e.g., all the way from manifold 106 to die exit 112, as well as from die exit 112 to the end of the curved passageway between sculpted surface 118 and the adjacent roller 204 or 302). Accordingly, the confluence of sculpted surface 118 and a corresponding surface of flow channel 116 preferably is contoured and not abrupt. Stated alternatively, sculpted surface 118 and a corresponding surface of flow channel 116 preferably is a geometrically continuous surface.

In an embodiment of the invention, die exit 112 is of uniform height 126 across the width of sculpted extrusion die 100. As such, the extrudate exiting die exit 112 will be of substantially uniform thickness. In alternate embodiments, die exit 112 is of non-uniform height 126 across the width of sculpted extrusion die 100. In such cases, the extrudate exiting die exit 112 will be of non-uniform thickness. The desired thickness of the extrudate preferably is maintained with a die adjustment mechanism as described in the foregoing.

As illustrated in FIGS. 2 and 3, the path of extrudate travel extends from manifold 106 along flow channel 116 to die exit 112 and thereafter along the curved passageway between sculpted surface 118 and circumferential (or perimetrical) surface 210 or 304. The illustrated curved passageway between sculpted surface 118 and circumferential (or perimetrical) surface 210 or 304 spans the first circumferential (or perimetrical) extent 212 or 306 of roller 204 or 302.

In use, extrudate from manifold 106 travels along flow channel 116 towards die exit 112 whereat the extrudate exits sculpted extrusion die 100 and is directed onto circumferential (or perimetrical) surface 210 or 304 of a rotating roller 204 or 302. In an embodiment of the invention, roller 204 or 302 rotates in a counter-clockwise direction (as seen in the attached figures) such that the extrudate exiting die exit 112 passes through the curved passageway between sculpted surface 118 and the circumferential (or perimetrical) surface 210 or 304 of the adjacent roller 204 or 302. Rotating roller 204 or 302 facilitates movement of the extrudate deposited thereon, and the extrudate, in the form of a continuous sheet of polymer, passes through the curved passageway between sculpted surface 118 and circumferential (or perimetrical) surface 210 or 304. The sheet of extrudate next travels along with the roller 204 (such that one of the extrudates major faces is carried against the roller, while its other face is exposed) until reaching and passing through nip 208 between rollers 204 and 206 of calender 202. (The nip 208, of course, is not present when only a single roller 302 is used.) As described herein above and herein below with reference to FIG. 4, the thickness of the sheet of extrudate exiting the curved passageway between sculpted surface 118 and circumferential (or perimetrical) surface 210 or 304 can be adjusted using a die adjustment mechanism to change height 126 of die exit 112 and/or to change the distance between sculpted surface 118 and circumferential (or perimetrical) surface 210 or 304.

In accordance with an embodiment of the invention, FIG. 4 illustrates extrudate flow path 434 through sculpted extrusion die 200 juxtaposed with circumferential (or perimetrical) surface 210 of roller 204 of calender 202 (or circumferential (or perimetrical) surface 304 of roller 302). As can be seen, the embodiment of sculpted extrusion die 200 shown in FIG. 4 is substantially similar to the embodiment of sculpted extrusion die 100 shown in FIGS. 1-3. Accordingly, like elements are indicated by like numerals and the following description in reference to FIG. 4 is primarily directed to features and elements of sculpted extrusion die 200 that are different from those previously described in reference to FIGS. 1-3 for sculpted extrusion die 100.

Sculpted extrusion die 200 comprises upper and lower die body portions 102 and 404 which together form a pair of mating die body portions defining manifold 106 and cavity 114. As illustrated, flow channel 416 provides fluid communication between manifold 106 and die exit 112. The extrudate, represented by the dark regions, supplied to manifold 106 flows through flow channel 416 and exits extrusion die 200 through die exit 112. In the embodiment of sculpted extrusion die 200 shown in FIG. 4, flow channel 416 includes secondary manifold 406 between manifold 106 and die exit 112. As such, section 428 of flow channel 416 between manifold 106 and secondary manifold 406 is referred to as preland section 428, and section 430 of flow channel 416 between secondary manifold 406 and die exit 112 is referred to as land section 430. As is well known in the art, the exact structures of manifold 106, cavity 114, secondary manifold 406, flow channel 416 and land and preland sections 430 and 428, respectively, can be varied and may conform to any of a number of different conventional designs for a coat hanger type extrusion die.

In FIG. 4, sculpted extrusion die 200 is shown comprising die adjustment mechanism 432 which, as previously described, can be used for adjusting both the thickness of the extrudate exiting die exit 112 and the thickness of the extrudate on circumferential (or perimetrical) surface 210. Several alternative embodiments of die adjustment mechanisms are well known in the art. The configuration and installation (or positioning) of die adjustment mechanism 432 as shown in FIG. 4 should be considered as being exemplary for illustrative purposes only and therefore not considered as being limiting in any respect. Generally, die adjustment mechanism 432 engages die lip adjustment channel 122 and is operated to change height 126 of die exit 112 and/or to change the distance between sculpted surface 118 and circumferential (or perimetrical) surface 210 (or 304). As shown, upper die lip 108 comprises a relatively narrow neck 124 serving as a thin flex hinge. The flex hinge provides a certain degree of flexibility, thus making the upper die lip 108 a flexible lip, such that narrow neck 124 flexes when upper die lip 108 is moved by die lip adjustment mechanism 432. Since the configuration of die lip adjustment channel 122 can be varied to accommodate many different die lip adjustment mechanisms, the related details shown in the attached drawings (e.g., the flex hinge, die lip adjustment channel 122, etc.) are not limiting to the invention. In an embodiment of the invention, the die lip adjustment mechanism is used for moving the flexible lip (i.e., the upper die lip 108, which is rendered flexible by the flex hinge) so as to effectuate the thickness of the extrudate exiting die exit 112, e.g., by adjusting the distance between sculpted surface 118 and the juxtaposed circumferential (or perimetrical) roller surface 210 (or 304).

As illustrated in FIG. 4, extrudate travel path 434 extends from manifold 106 along flow channel 416 to die exit 112 and thereafter along the curved passageway between sculpted surface 118 and circumferential surface (or perimetrical) 210 (or 304). At die exit 112, the extrudate is directed onto circumferential (or perimetrical) surface 210 of rotating roller 204 (or surface 304 of rotating roller 302). Rotating roller 204 (or 302) facilitates movement of the extrudate along extrudate flow path 434 and the extrudate, in the form of a continuous sheet of polymer, passes through the curved passageway between sculpted surface 118 and circumferential (or perimetrical) surface 210 (or 304). The sheet of extrudate continues traveling with roller 204 along extrudate flow path 434 until reaching and passing through nip 208 between rollers 204 and 206 of calender 202. (This, of course, is not the case when only a single roller 302 is used.)

The embodiments disclosed herein generally pertain to extrusion dies for extruding sheets of polymer, such as thermoplastic film, and foam sheets with substantially reduced or minimal irregularities in the extruded product. However, the invention also extends to other extrusion applications wherein a sculpted die is juxtaposed with a roller taught by the present disclosure.

The basic components of an extrusion die are well known in the present art. Additionally, the basic methods of manufacturing extrusion dies are well known in the art, and therefore need not be described here. Furthermore, the basic procedures for operating extrusion dies, components and procedures for controlling the flow of extrudates, die lip adjustment mechanisms, apparatus and methods for scraping the one or more lips of the extrusion dies, etc., are well known in the art, and are therefore not described here. By way of example, such information is included in the following co-owned U.S. Patents and U.S. Patent Application Publications, all of which are incorporated herein by reference in their entirety: Ser. Nos. 7,056,112, 5,770,240, 6,663,375 6,206,680, 6,352,424, 6,109,592, 6,367,776, 6,682,333, 7,074,030, 2007/0273068, and 2007/0045904.

The processes for manufacturing a conventional extrusion die are well known to the person of ordinary skill in the art. In view thereof, a few extra steps would be necessary for manufacturing the sculpted extrusion die in accordance with the various embodiments of the instant invention. For instance, curved surfaces 118 and 120 are sculpted (or machined) using a standard computer numerical control (CNC) milling machine. Additionally, sculpted surfaces 118 and 120 preferably are polished to a mirror-like finish using techniques and methods well known in the art, including manual polishing, and combination of surface grinding and manual polishing.

The present extrusion device is configured to produce (and the present method can produce) extrudate having substantially no die lines (or no die lines). Additionally, the present device and method can be configured to produce extrudate having substantially no edge bead (or no edge bead).

Various modifications and additions may be made to the exemplary embodiments described hereinabove without departing from the scope, intent and spirit of the instant invention. For example, while the disclosed embodiments refer to particular features, the scope of the instant invention is considered to also include embodiments having various combinations of features different from and/or in addition to those described hereinabove. Accordingly, the present invention embraces all such alternatives, modifications, and variations as within the scope, intent and spirit of the appended claims, including all equivalents thereof.

I claim:

1. An extrusion device comprising a roller having a circumferential surface with a first circumferential extent and a second circumferential extent and an extrusion die having first and second integral die body portions defining a manifold, first and second mating die lips defining a die exit in fluid communication with said manifold, and a die adjustment mechanism, said first integral die body portion forming said first mating die lip and said second integral die body portion forming said second mating die lip, each of said first and second mating die lips has a sculpted surface having a radius of curvature equal to a radius of curvature of said roller, said roller being positioned adjacent to said sculpted surface of each of said first and second mating die lips, at least one lip of said first and second mating die lips is a flexible lip having a narrow neck portion, said narrow neck portion extending from and being integral with one of said first and second integral die body portions, said narrow neck portion being adapted to flex to facilitate movement of said flexible lip, said die adjustment mechanism is connected to said flexible lip and one of said first and second integral die body portions and is operable to move said sculpted surface of said flexible lip to adjust a distance between said sculpted surface of said flexible lip and said circumferential surface of said roller so that there is substantially no air gap between said roller and said extrusion die, and said first circumferential extent of said roller is nested against said sculpted surface of said first die lip and said second circumferential extent of said roller is nested against said sculpted surface of said second die lip.

2. The device of claim 1, wherein said flexible lip is movable to simultaneously change:

the distance between said sculpted surface of said flexible lip and said circumferential surface of said roller; and a distance between said first and second mating die lips.

3. The device of claim 1, wherein said die exit has a height and said flexible lip is further movable to change a distance between said first and second mating die lips so as to change the height.

4. The device of claim 1, wherein said manifold has a flow channel surface extending to said die exit and said sculpted surface of said flexible lip is geometrically continuous with said flow channel surface.

5. The device of claim 1, wherein said die exit is devoid of any sharp corners or edges.

6. The device of claim 1, wherein said extrusion device provides a path for extrudate travel having a first portion and a second portion, said first portion extending from said manifold to said die exit, said second portion extending from said sculpted surface of said flexible lip to said circumferential surface of said roller.

7. The device of claim 6, wherein the other of said first and second mating die lips is a fixed lip, and wherein following the turn in the path of extrudate travel, the path of extrudate travel moves away from the fixed lip.

8. The device of claim 1, wherein said second circumferential extent is greater than said first circumferential extent.

9. The device of claim 1, wherein an arithmetic ratio of said second circumferential extent to said first circumferential extent is greater than or equal to two.

10. The device of claim 1, wherein said roller is positioned adjacent said sculpted surface of each of said first and second mating die lips such that extrudate emanating from said extrusion die does not travel across an air gap prior to contacting said roller.

11. The device of claim 1, wherein said flexible lip has a die lip adjustment channel, said die adjustment mechanism has an engagement hook, and said engagement hook connects with said die lip adjustment channel.

12. An extrusion device comprising a roller and an extrusion die, said roller having a first circumferential extent and a second circumferential extent, said extrusion die having a manifold, a die exit, and a die adjustment mechanism, said die exit being in fluid communication with said manifold, said extrusion die comprising first and second die body portions having respective first and second die lips integrally formed therewith and between which said die exit is located, said first and second die lips each having a sculpted surface shaped so as to have a radius of curvature substantially matching a radius of curvature of said roller, such that said sculpted surfaces are configured to be operatively positioned alongside said roller, at least one of said first and second die body portions has an integrally formed narrow neck portion from which at least one of said first and second die lips extends so as to form a flexible lip, said narrow neck portion being adapted to flex and facilitate movement of said flexible lip, said die adjustment mechanism being connected to said flexible lip and being operable to move said sculpted surface of said flexible lip to adjust a distance between said sculpted surface and said roller so that there is substantially no air gap between said roller and said extrusion die, and said first circumferential extent of said roller being nested against said sculpted surface of said first die lip and said second circumferential extent of said roller being nested against said sculpted surface of said second die lip.

* * * * *